(12) United States Patent
Lew

(10) Patent No.: US 6,398,313 B1
(45) Date of Patent: Jun. 4, 2002

(54) TWO COMPONENT COMPOSITE BICYCLE RIM

(75) Inventor: Paul Lew, Las Vegas, NV (US)

(73) Assignee: The Polymeric Corporation, Boulder City, NV (US)

( * ) Notice: Subject to any disclaimer, the term of this patent is extended or adjusted under 35 U.S.C. 154(b) by 0 days.

(21) Appl. No.: 09/548,068

(22) Filed: Apr. 12, 2000

(51) Int. Cl.$^7$ .................. B60B 21/00; B60B 25/00; B60B 1/02
(52) U.S. Cl. .................. 301/96; 301/55; 301/99; 301/100
(58) Field of Search .................. 301/55, 58, 95, 301/96 I, 97, 98, 99, 100, 103, 30, 30.2, 31, 33, 64.7

(56) References Cited

U.S. PATENT DOCUMENTS

| 492,667 | A | * | 2/1893 | Fitzgerald | 301/100 |
|---|---|---|---|---|---|
| 974,399 | A | * | 11/1910 | Lawrie | 301/99 |
| 1,236,921 | A | * | 8/1917 | Fraser | 301/99 |
| 4,314,964 | A | * | 2/1982 | Ferrery | 301/95 |
| 4,702,528 | A | * | 10/1987 | Sacks | 301/99 |
| 4,930,843 | A | * | 6/1990 | Lewis | 301/95 |
| 4,995,675 | A | * | 2/1991 | Tsai | 301/95 |
| 5,104,199 | A | * | 4/1992 | Schlanger | 301/95 |
| 5,246,275 | A | * | 9/1993 | Arredondo, Jr. | 301/64.7 |
| 5,249,846 | A | * | 10/1993 | Martin et al. | 301/64.7 |
| 5,470,133 | A | * | 11/1995 | Kuo et al. | 301/95 |
| 5,653,510 | A | * | 8/1997 | Osborne | 301/95 |
| 5,734,142 | A | * | 3/1998 | Kazmierczak | 301/96 |
| 6,048,035 | A | * | 4/2000 | Chen | 301/58 |

* cited by examiner

Primary Examiner—S. Joseph Morano
Assistant Examiner—Jason R. Bellinger
(74) Attorney, Agent, or Firm—M. Reid Russell

(57) ABSTRACT

A bicycle rim constructed from a fiber reinforcement impregnated with a resinous material to provide stiffness, strength, is light in weight and presents minimal aerodynamic drag. The rim is constructed from two semi-circular rim sections that are each formed from glass, carbon, or boron fibers that are applied at distinctive crossing angles as layers or "plys", receive an epoxy thermoset resin or a nylon thermoplastic resin, and are cured in a mold cavity. A pair of rim half sections are matched and are coupled together at their ends into a circle by telescoping aligned ends of each of the rim half sections over inner inserts that an epoxy structural adhesive has been applied to, and the joined rim section ends receive a gusset fitted and bonded along the rim half section end junctions, and with the finished rim drilled appropriately. to receive and mount spoke ends.

9 Claims, 4 Drawing Sheets

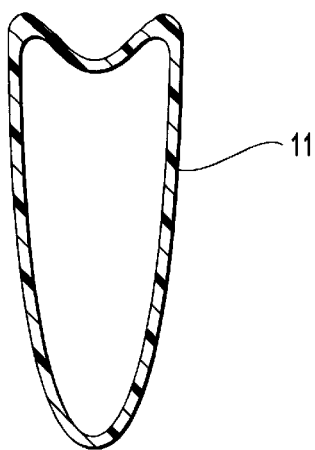
FIG. 1
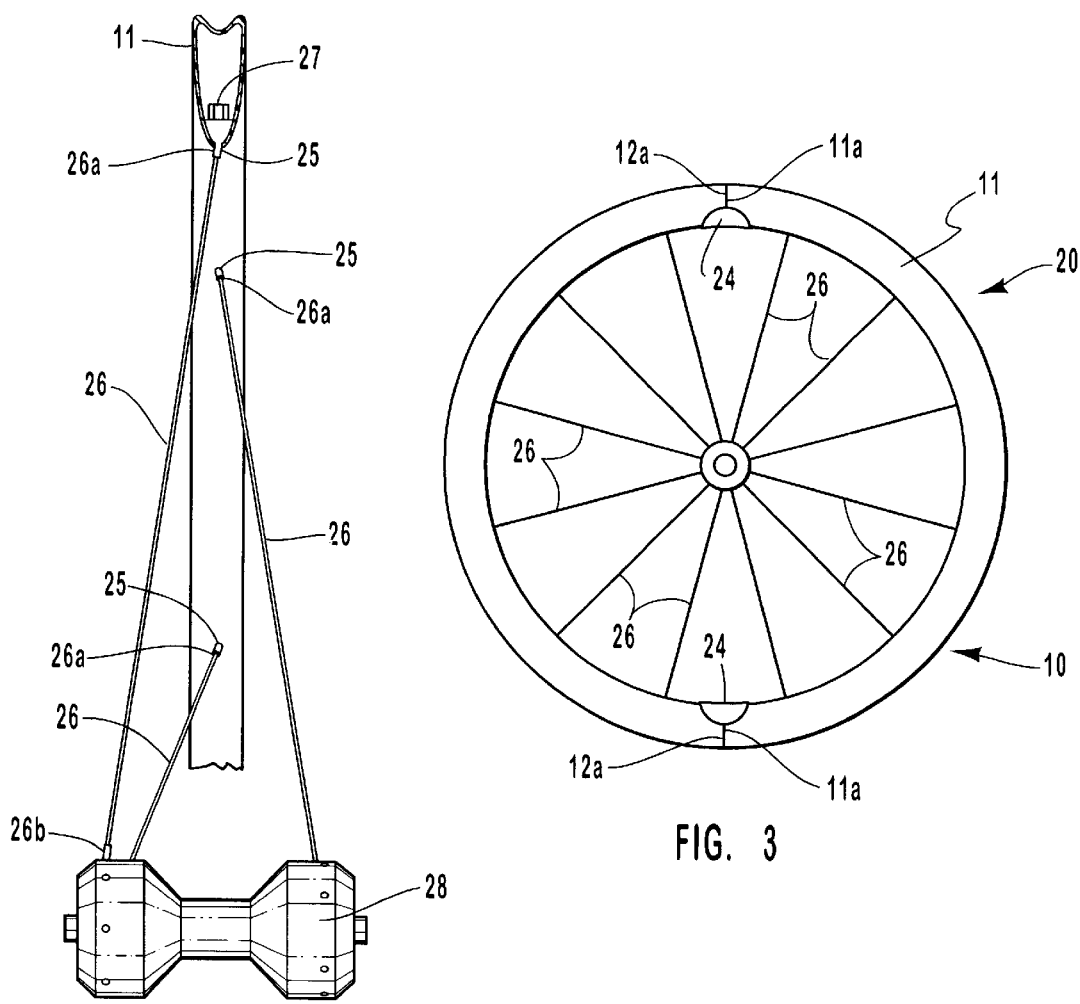
FIG. 2
FIG. 3

TWO COMPONENT COMPOSITE BICYCLE RIM

BACKGROUND OF THE INVENTION

1. Field of the Invention

The present invention relates to bicycle rims and other like rims that are composites manufactured as multiple components that are assembled after molding.

2. Prior Art

While current light-weight bicycle rim technology encompasses composite rim and wheel construction, most such composite rims are manufactured as a one piece component with no secondary assembly required to complete the rim structure. Where a composite rim has been manufactured as multiple components and assembled after molding, the segmentation of the rim is through the centerline of the "Z" axis as opposed to the "X" or "Y" axis, and such sections have often not been well matched creating a finished rim that is warped or is out of round. Additionally, in practice, current composite rim construction has been based upon a woven reinforcement design and no product is currently available that is marketed as a unidirectional laminate structure.

Further, because high pressure is required to sufficiently compact the multiple unidirectional layers, also known as "plys" of unidirectional fibers of the rim structure, a heavy solid shaped mandrel is required to allow for a creation of a pressure thereagainst that is necessary to compact such multiple layers. The present invention that utilizes a two piece rim that are joined by bonding at their ends, with each rim piece or half section formed on a mandrel capable of expanding under curing heated to create an outwardly directed force on the material laid up on the mandrel surface, compresssing layers against a mold cavity wall. Such a heavy internal pressure creating mandrel is extracted after curing, leaving only the hollow, light-weight rim half section. The molding technique of the invention further deviates from traditional composite molding techniques, such as are used with fiberglass, or carbon fiber, molding techniques due to the high pressure as is required to compact the multi-ply laminate. Where traditional molding techniques required only a maximum of fourteen (14) psi to appropriately mold the laminate, the invention requires a minimum of two hundred fifty (250) psi to sufficiently compact the multiple layers or plys forming the rim of the invention.

SUMMARY OF THE INVENTION

A bicycle rim, or like rim, is constructed from layers of plys of unidirectional fiber layers to provide a rim that improves upon traditional metal of other composite construction by a decrease in weight, an increased strength and stiffness while providing a profile having low aerodynamic drag characteristics. These rim improvements decrease the time and/or effort required by a cyclist to pedal a given distance, providing for an improvement in acceleration and a decrease in required human power output. This increased efficiency and performance is achieved by a decrease in rim rotational inertia and by a creation of an aerodynamically enhanced shape. The light weight construction and aerodynamically enhanced shaped is achieved through a unique combination of a use of multiple layers of unidirectional reinforcement that is applied at high pressure in a unique molding technique where the rim is formed in two identical hollow hemispherical sections that are joined together at their ends using internal inserts telescoped into the rim section ends ends that are pushed together and bonded therein, and by fitting a V-shaped external gusset over the joined ends, with the internal insets and external gussets each receiving a bonding material, such as a standard two part epoxy structural adhesive, applied thereto prior to fitting the components together, creating a continuous structure.

It is an object of the present invention is to provide a fiber reinforced rim that is exceptionally strong and light in weight by a manufacture of separate hollow hemispherical rim sections by an application of layers or plys of unidirectional fibers that are arranged at distinctive crossing angles and within separate planes, that are subjected to heat and high pressure to create identical rim sections for joining at their ends by an adhesive bonding into a rim that is appropriate to carry design static and dynamic loads.

Another object of the present invention is to provide a rim to carry anticipated static and dynamic loads by formation of a reinforcement by an application onto a mandrel of multiple plys of unidirection fibers that are arranged in distinctive crossing angles, and within separate planes, onto a removable mandrel and including applications of an epoxy thermoset resin or a nylon thermoplastic resin to the layers of fiber, and maintaining the mandrel and reinforcement at a temperature of approximately two hundred five (205) degrees Celsius for a period of time to cure the reinforcement to form the rim hemispherical sections that are matched, and the matched rim half sections are joined at their ends into a circular rim.

Still another object of the present invention is to provide, as separately manufactured items, identical hollow hemospherical rim sections and joining a pair of matched rim sections by telescoping the rim sections ends together over each of a pair of internal insert coated with an adhesive and by bonding a V-shaped gusset over each of the butting ends joint.

BRIEF DESCRIPTION OF THE DRAWINGS

These and other objects and features of the present invention will become more apparent from the following description in which the invention is described in detail in conjunction with the accompanying drawings:

FIG. 1 is a profile view of a cross section of a rim of the invention;

FIG. 2 is a profile view of a quarter section of a bicycle wheel showing a hub with spokes radiating radially outwardly therefrom that connect, at spaced interval, into the rim of FIG. 1 that rim has been drilled to receive which spokes;

FIG. 3 is a side elevation of a bicycle wheel that includes the rim of FIG. 1 shown formed in two hemispherical sections that are joined together at their ends, with a gusset shown placed over the outside of the rim at the joined ends;

DETAILED DESCRIPTION

Figure 4:
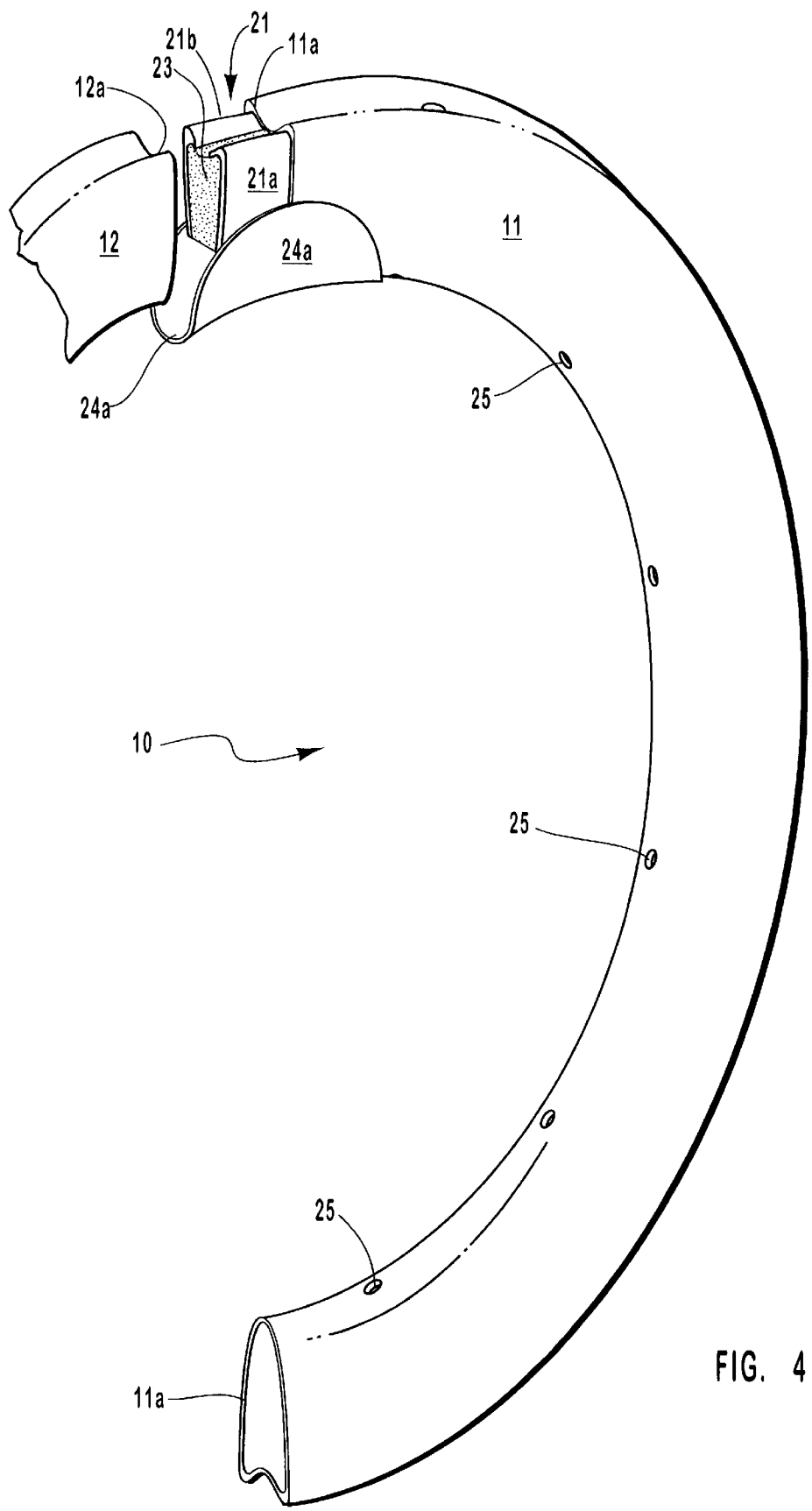
FIG. 4 is a side elevation perspective view of a full half section of the rim of FIG. 1, showing a section of the rim half section aligned for fitting over an inner insert fitted into an end of another rim half section and showing an exterior gusset fitted onto one of the rim half sections for coupling the rim half sections together at their ends, forming the rim of FIG. 3.

The invention is hereinafter described with reference to a bicycle rim that is included in a bicycle wheel. Though, it should be understood, the invention is not necessarily limited to bicycle rims and wheels and could be utilized with other like rim and wheel arrangements and, of course, is suitable for manufacture of any appropriate size of bicycle rim. Accordingly, while a preferred embodiment of the invention is herein shown, the invention is applicable to a number and variety of rim and wheel configurations within the scope of this disclosure.

FIG. 1 shows a profile cross section of a rim half section 11 of the invention that is a component of a bicycle wheel 10, as shown in FIGS. 2 and 3. The rim half section 11 is shown in FIGS. 1, 4, 5, 6, 8 and 10, as having a thin side wall that may, or may not, be of a uniform thickness. In fact, the rim wall thickness may vary depending upon the section of the rim as is being formed, providing that identical halves of the rim half section on opposite sides of a center vertical axis therethrough are identical.

To form the rim half section 11, multiple layers or "plys" of unidirectional fibers, preferably, carbon fibers, though glass, boron, or the like, are arranged in layers at distinctive crossing angles, and in separate planes, to create a structure that is appropriate to carry the anticipated static and dynamic loads of a rim for any given size, model or type of bicycle. This reinforcement is the first and primary constituent of the structure and occupies approximately seventy two (72) per cent by volume. An epoxy thermoset resin or a nylon thermoplastic resin is used to coat the layers or plys as they are laid up and function as the secondary constituent of the structure and will occupy approximately twenty eight (28) per cent by volume. The coated layers or plys are to be heated in a mold temperature of approximately two hundred five (205) degrees Celsius to cause a sufficient flow of the resin to properly bond together the unidirectional fibers of the reinforcement.

Figure 5:
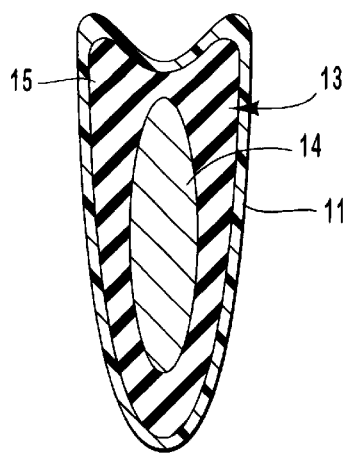
FIG. 5 shows a profile cross sectional view of the rim of FIG. 1 being formed on a mandrel that includes a core covered by a silicone material, illustrating a preferred mandrel whereover the rim half section is formed.
Figure 7:
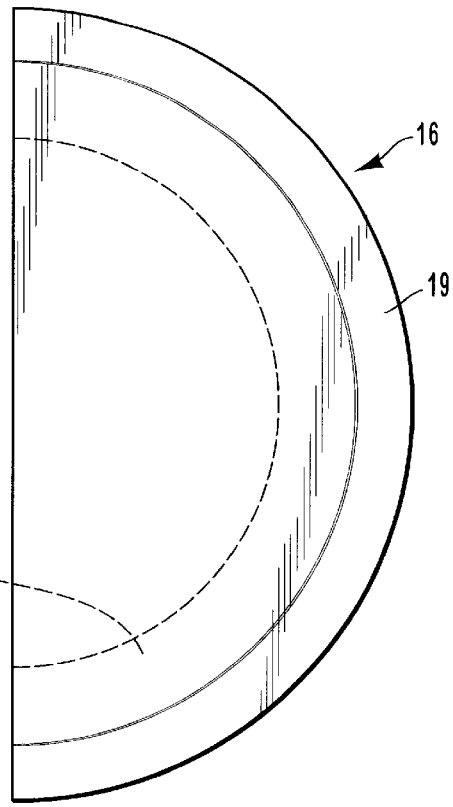
FIG. 7 is a top plan view of the mold containing the rim half section and mandrel of FIG. 6.
Figure 6:
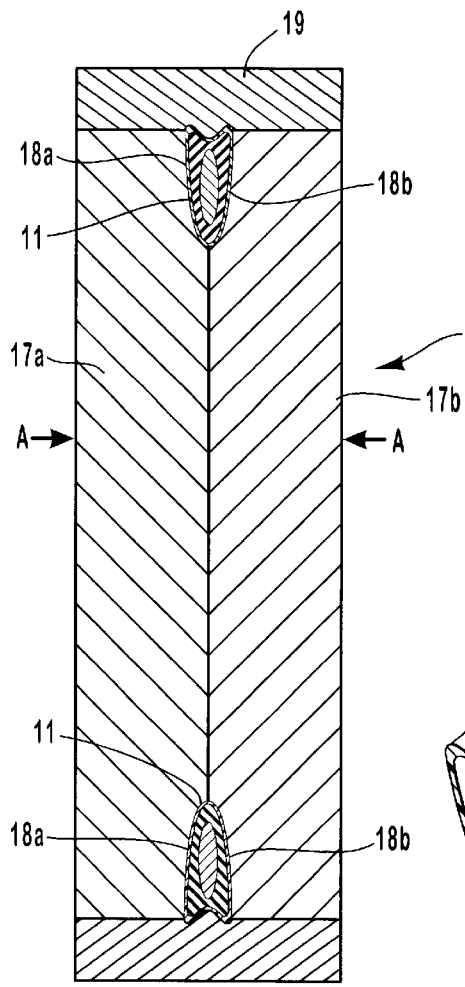
FIG. 6 shows a profile cross sectional view of a mold containing the rim half section and mandrel of FIG. 5.

In practice, to form rim half section 11, layers or plys of the reinforcement are saturated with the appropriate amount of uncured resin and are laid up in layers upon a rigid appropriately shaped mandrel 13, and one such mandrel is shown in a cross section view of FIG. 5 that is appropriate for practicing the invention. Shown in FIG. 5, the mandrel 13 core 14 is preferably constructed from two thousand (2000) or six thousand (6000) series aluminum that is coated with pourable Room Temperature Vulcanizing (RTV) silicone 15. Mandrel 13, after being surrounded by resin coated layers or plys of the reinforcement is placed into a rigid mold 16, as shown in FIGS. 6 and 7, and best in FIG. 6, that consists of opposing metal plates 17a and 17b that each have a half circular cavity 18a and 18b, respectively, formed therein that the mandrel 13 coated with the layers or plys of resin coated reinforcement is place in With the mold 16 metal plates 17a and 17b contained in a metal ring 19. The mold cavities 18a and 18b together have a molding surface that is identical to that of the finished surface of the cured rim half section 11. So arranged, the mandrel plates 17a and 17b are held or pressed tightly together, as illustrated by arrows A. Heat is applied through the mold to approximately two hundred five (205) degrees Celsius, but which heat may be in a range of from ninety (90) to three hundred (300) degrees Celsius for a period of approximately forty five (45) minutes, but which applied heat for a period of time is proportional with a straight line graph having end points at ninety (90) degrees Celsius for two hundred (200) minutes and at three hundred (300) degrees for fifteen (15) minutes setting out the relationship of heat to time to provide a successful rim half section compression and curing, within the scope of this invention. The heat acts as a catalyst in the reaction of the resinous material providing a curing of the reinforcement. Heat transmitted through the mold not only cures the resin, it also creates an expansion in the dimensions of the aluminum and silicone mandrel resulting in the compaction of the multiple layers of plys of reinforcement from the inside out, compressing the reinforcement against the metal mold cavity 18a and 18b walls. In this process a pressure of preferably two hundred fifty (250) psi is exerted into the reinforcement, but which pressure may be from two hundred twenty (220) to fofur hundred (400) psi within the scope of this disclosure, to adequately compact the reinforcement fiber and resin together during the curing process.

Upon completion of the cure cycle the mold 16 containing the cured rim half section 11 and mandrel 13 is opened and the rim half section containing the mandrel 13 is removed. Thereafter, the half rim section 11 and mandrel 13 are placed into a freezer that is maintained at approximately zero degrees Celsius. During cooling, the mandrel 13 experiences contraction of the aluminum core 14 and silicone 15 and separates from the rim half section 11 compacted layers or plys providing a separation that allows the rim half section 11 to be removed from the mandrel. The mandrel 13 can then be reconditioned for use in forming another rim half section thereon.

Figure 11:
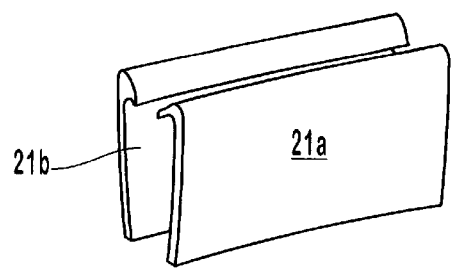
FIG. 11 shows a side elevation perspective view taken from ahead showing side walls of a non-continuous second embodiment of an inner insert for joining rim half sections together.
Figure 10:
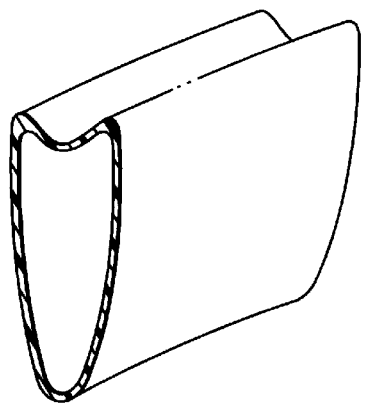
FIG. 10 shows a side elevation perspective view taken from a ahead of a continuous inner insert showing a first embodiment of an inner insert for joining rim half sections together.
Figure 12:
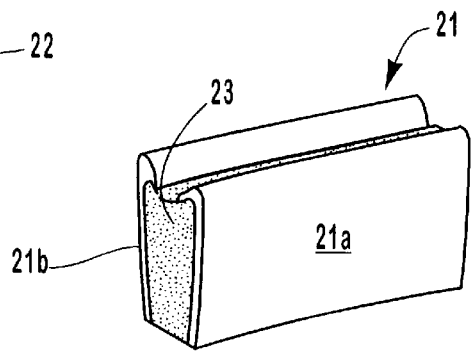
FIG. 12 shows the inner insert spaced side walls of FIG. 11 as having received a foam core fitted therebetween.
Figure 13:
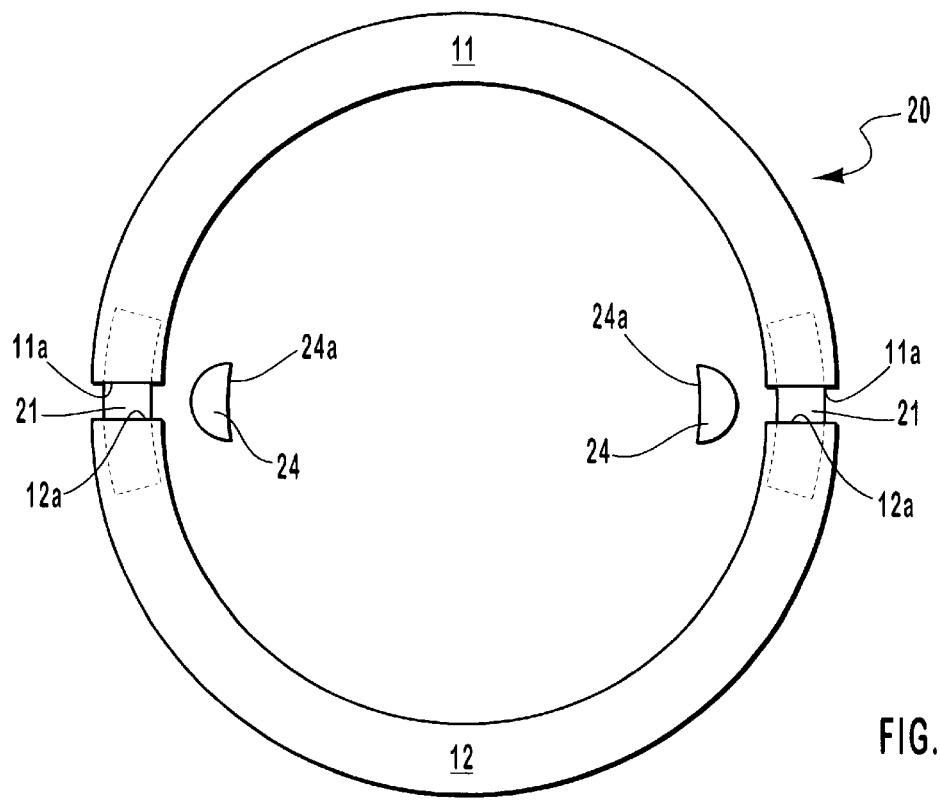
FIG. 13 shows a side elevation view of the rim half sections ends fitted over the inner inserts, shown in broken lines, with the V-shaped shown gussets aligned for fitting onto the joined rim ends at the rim inner circumference.

After completion of the cure of two rim half sections 11 and 12, respectively, the one half rim is matched with the other half rim to provide, when completed as the circular rim, as shown in FIGS. 3 and 13, a rim that is essentially a perfect circle and is not warped. The two rim half sections 11 and 12, respectfully, are joined by fitting an internal insert 21 or 22, shown in FIGS. 4 and 8, coated with an adhesive, into one half section 11 end and 11a and passing an end 12a of half section 12 thereover until which ends 11a and 12a butt together. Examples of internal inserts 21 and 22 are shown in FIGS. 10, 11 and 12, respectively, and can be constructed from any number of materials, including composites and/or metal. Examples of two internal inserts 21 and 22 are shown, through, it should be understood, the invention is not limited to any one particular insert or insert configuration, and that the internal inserts 21 and 22 are shown herein as examples only.

Internal insert 21, shown in FIGS. 11 and 12, is noncontinuous and is formed in two side sections that are arranged as mirror images to one another and each is shaped to essentially conform to each of the inner surface of the rim half section walls. The internal insert 21 is formed by attaching the halves opposing faces, as shown in FIG. 12, to a section 23 of a foam, as shown, or to any other type of semi-structural material to include: balsa wood, honeycomb, a syntactic filler, or the like. The finished internal insert 21 having a shape and dimensions to fit snugly into the ends 11*a* and 12*a* of the rim half sections 11 and 12. After coating with an adhesive, that is preferably any standard two part epoxy structural adhesive, the rim half section ends 11*a* and 12*a* are slid over the internal insert 21, as shown in FIGS. 4 and 13, connecting the rim half sections, forming the rim 20.

Figure 8:
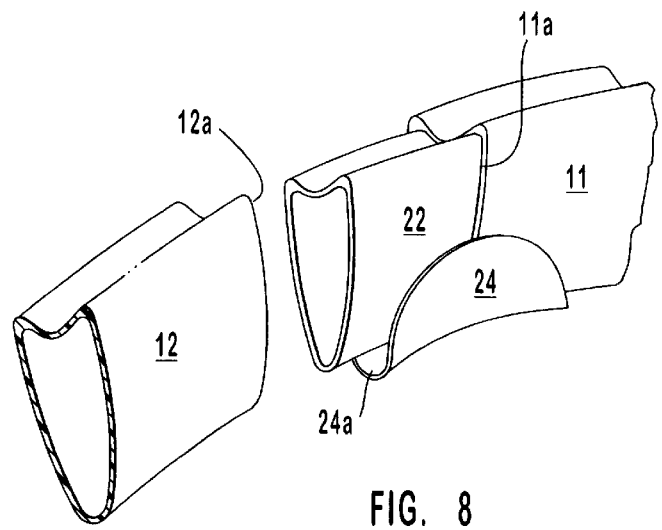
FIG. 8 is a side elevation perspective view showing the telescoping together of the rim half sections ends over inner inserts and showing gussets fitted across the butting rim half section ends to assemble the rim of the invention.
Figure 9:
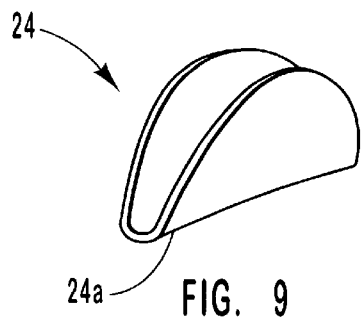
FIG. 9 shows a side elevation perspective view taken from ahead of the gusset showing the gusset as a flat circle that is bent across is mid-section or axis a into a V shape.

Alternatively, the continuous internal insert 22 can be used, as shown in FIG. 8, for joining the rim half sections 11 and 12 ends 11*a* and 12*a* together. The internal insert, shown in FIG. 10, is formed as a thin walled continuous section of a metal, composite, or other appropriate material, to have a shape and dimensions to fit snugly into the rim half sections ends 11*a* and 12*a*. With, in practice, like the internal insert 21, the internal insert 22 is coated with an adhesive, that is preferably any standard two part epoxy structure adhesive, prior to fitting the two rim half section ends 11*a* and 12*a* together, as shown in FIG. 8.

After fitting and securing the rim half sections 11 and 12 together at their butting ends 11*a* and 12*a*, a gusset 24, shown best in FIG. 3, is installed to the rim inner circumference, extending partially around the junction of the rim half section ends 11*a* and 12*a*, as shown in FIGS. 3, 4, 8 and 13. The gusset 24, as shown, is preferably formed as a thin disk of an appropriate material such as a metal, composite, or the like, and is bent across a mid-section or axis 24*a* thereof into a V-shape. The V-shape is such that the area between the V sides will approximate, to fit snugly against, the rim 20 inner circumference and over the rim 20 lower sides at the junctions of the rim half section ends 11*a* and 12*a*. The gusset 24 also receives a coating of an adhesive over its inner surface, such as a standard two part epoxy structure adhesive as is used to coat the internal insert 21 or 22, for permanently securing the gussets across the connection of the rim half sections 11 and 12 at their ends 11*a* and 12*a*, completing the rim 20.

The rim 20 can then be drilled at spaced internals around the rim 20 longitudinal center line, shown at 25 in FIGS. 2 and 4, to receive spoke rim ends 26*a* fitted therethrough and connected in spoke attachments 27 that are fitted through outer rim holes, not shown, and are maintained in the rim 20, as shown best in FIG. 2. The spoke 26 spoke hub ends 26*b* are secured to a hub 28, as shown in FIGS. 2 and 3, completing a bicycle wheel 20.

Hereinabove has been set out a description of a preferred rim of the invention that is formed by connecting separately formed rim half sections at their ends, along with embodiments of internal inserts for use in making which end connection, and gusset components for reinforcing the rim at the rim half section ends joints. It should, however, be understood that the present invention can be varied within the scope of this disclosure without departing from the subject matter coming within the scope of the following claims, and a reasonable equivalency thereof, which claims I regard as my invention.

I claim:

1. A bicycle rim comprising, a pair of identical rim half sections that are joined end to end into a circular rim, and each said rim half section is a continuous hollow fiber reinforcement consisting of a resinous material as layers of reinforcement that receive a resinous material coating and is heat cured in a rigid heated mold, forming each said rim half section, and said rim half sections are matched in pairs to provide, when said rim half sections are joined at their ends, a rim that is essentially a circle; a pair of inner inserts that are each individually formed and coated with an adhesive to fit snugly in a rim half section end, permanently coupling said pairs of rim half section ends together; a pair of gussets that are each formed from a flat section of a stiff material that is bent double into a V-shape whose inner surface receives an adhesive with each said gusset to fit and couple across and up sides of said rim half sections at their end junctions; and spokes extending radially inwardly, at spaced intervals, from around an inner circumference of said joined rim half sections.

2. The bicycle rim as recited in claim 1, wherein the rim half sections are approximately seventy two (72) per cent by volume of unidirectional fibers and approximately twenty eight (28) per cent by volume of resinous material.

3. The bicycle rim as recited in claim 1, wherein the fiber reinforcement are mats or carbon fibers having layers or plys arranged at distinctive crossing angles; and the resinous material is an epoxy thermoset resin or a nylon thermoplastic resin.

4. The bicycle rim as recited in claim 1, wherein the inner inserts are each a hollow section that is formed to fit longitudinally into aligned ends of the rim half sections, and the adhesive is applied to an outer surface of each said hollow section.

5. The bicycle rim as recited in claim 1, wherein the inner inserts are each formed from a pair of straight sections shaped to conform to inner surfaces of sides of each rim section and including a section of a semi-structural material fitted between said pair of sides; and the adhesive is applied to the outer surface of said pair of straight sides to bond to said rim half sections.

6. The bicycle rim as recited in claim 1, wherein the semi-structural material is a section of foam.

7. The bicycle rim as recited in claim 1, wherein the adhesive used to coat the inner inserts is a two part epoxy structural adhesive.

8. The bicycle rim as recited in claim 1, wherein the pair of gussets are each formed from a flat thin disk of a stiff material that is bent double into the V-shape.

9. The bicycle rim as recited in claim 8, wherein the adhesive used to coat inner surfaces of the gussets is a two part epoxy structural adhesive.

* * * * *